April 11, 1950 E. K. GRIP 2,503,332
DIFFERENTIAL GEAR TENS TRANSFER DEVICE
Filed April 21, 1948 2 Sheets-Sheet 1

Inventor
Erik Konrad Grip
by Jarvis C. Marble
his attorney

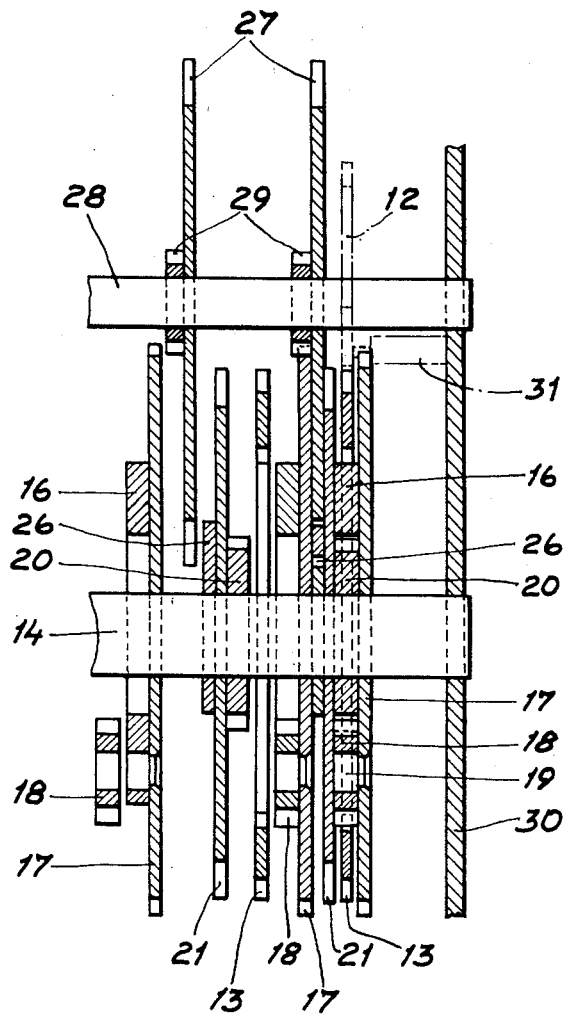

Patented Apr. 11, 1950

2,503,332

UNITED STATES PATENT OFFICE 2,503,332

DIFFERENTIAL GEAR TENS TRANSFER DEVICE

Erik Konrad Grip, Atvidaberg, Sweden, assignor to Aktiebolaget Facit, Atvidaberg, Sweden, a joint-stock company of Sweden Application April 21, 1948, Serial No. 22,413
In Sweden April 25, 1947

1 Claim. (Cl. 235—136)

This invention refers to calculating and similar machines of the type having registers according to the decimal system in which a continuous tens transfer takes place during the whole revolution of the numeral wheel or during a part of such revolution.

At the continuous tens transfer during the whole revolution of the numeral wheel, each numeral wheel is during the calculating operations continuously rotated forwards 1/10 of the amount which the numeral wheel of the next lower denomination is rotated. Thus, a rotation of, say, the units wheel one step corresponds to a rotation of 1/10 step of the tens wheel, 1/100 step of the hundreds wheel, etc.

The continuous tens transfer during a partial revolution of the numeral wheel may be carried out as illustrated and described in United States application Serial No. 22,414.

When in a register belonging to any of these types, a numeral value is entered also into the other denominations the value directly entered into each numeral wheel must be added to the value transferred from the numeral wheel of the next lower denomination. This is usually effected by means of a differential gear.

Heretofore such differential gear has had the disadvantage that it had to be made quite bulky, and because each numeral wheel has its own gear this means that the different numeral wheels must for this reason be spaced a relatively great axial distance from each other, thus rendering the machine bulky and the reading of the result more difficult.

The present invention eliminates these disadvantages entirely; the machine becomes very compact, and the numeral wheels are placed close to each other, thus rendering a small spacing (axial pitch) of the register possible and facilitating the reading of the register.

The invention can be applied to such registers in which the numeral wheel of the lower denomination, by means of a gear, actuates a toothed wheel of the next higher denomination, carrying a planet wheel, which planet wheel is both in mesh with the numeral wheel of the higher denomination via a sun wheel and a gear, and also, in mesh with a toothed (gear) ring which transfers the calculating impulses to the higher denomination, and the invention is chiefly characterized in, that on said toothed wheel, carrying the planet wheel, a bearing member is mounted, serving as a bearing for the toothed ring and also enclosing the planet wheel as well as the sun wheel, and thus the advantage is attained, that the toothed ring, the sun wheel and the planet wheel as well as the bearing member of the toothed ring are in the same plane, thus occupying together only so much space in the axial direction as the element which has the greatest (axial) width.

All of these elements preferably have the same (axial) width.

An embodiment of a register in accordance with the invention will now be described in connection with the annexed drawings.

Fig. 2 shows a cross-section along the line II—II in Fig. 1; in Fig. 2 the members assume their proper axial positions, except the details to the extreme left, which have been spaced apart axially, also for the sake of clearness.

Figure 1:
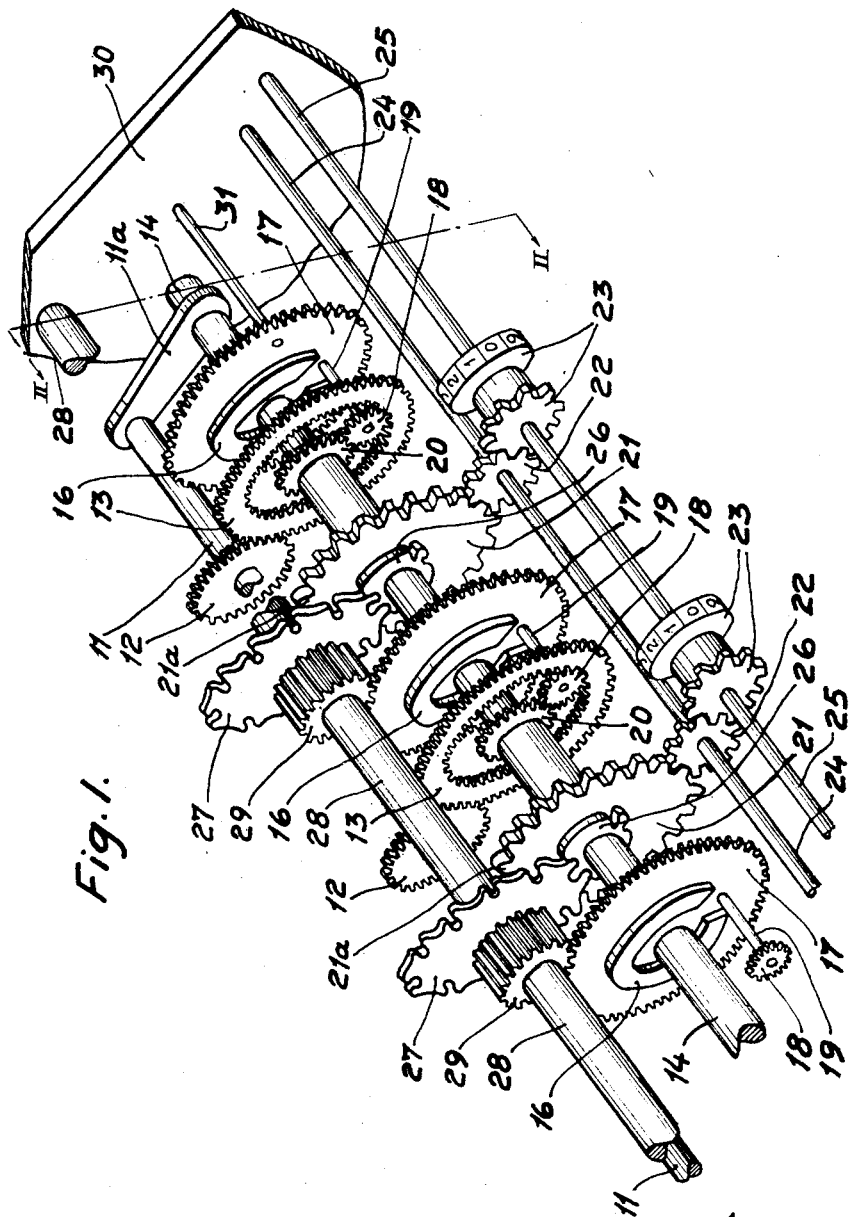
Fig. 1 shows a perspective view of a calculating machine register according to the invention with the different members spaced apart axially for the sake of clearness.

The invention is shown as applied to a calculating machine register with a tens transfer device according to the above mentioned United States application Serial No. 22,414 and consists of the following principal parts:

A transmission wheel shaft 11 is by means of arms 11a swingably journalled on the main shaft 14 of the register, and carries a series of transmission or intermediate gears 12. These transmission gears 12 are each in permanent mesh with the external teeth of their respective toothed (gear) rings 13, said rings being concentrically arranged with respect to the main shaft 14. The shaft 11, with the series of transmission gears 12, is swingable around the main shaft of the register from a position, in which the transmission gears are in mesh only with their respective toothed rings 13, to a position in which the transmission wheels are also in mesh with driving or actuator wheels (not shown) for the register. During the swinging motion the transmission gears 12 roll on the outside of their respective toothed rings 13.

The toothed rings 13, which have also internal teeth, are with the points of their internal teeth mounted on C-shaped bearing members 16, which are concentrically placed around the main shaft and each rigidly secured to a gear 17, said gears 17 being journalled on the main shaft 14. To each of the gears 17 a pin 19 is secured between the open arms of corresponding C member 16, said pin serving as a pivot for a planet gear 18, which is in permanent mesh both with the internal teeth of the toothed ring 13 and also with the teeth of a sun gear 20, journalled on the main shaft 14.

Each one of these sun gears is further rigidly connected with a gear 21, which is in mesh with a numeral wheel 23 via a transmission or intermediate gear 22. All these transmission gears 22 are journalled on a common shaft 24 and all the numeral wheels 23 on a special common shaft 25.

Each gear 21 is furthermore rigidly connected with a driving Geneva wheel (a Geneva drive) 26. These Geneva wheels each engage a driven Geneva wheel 27, all the wheels 27 being loosely journalled on a common shaft 28.

The hub of each driven Geneva wheel 27 is shaped to form a gear 29, which is in mesh with the gear 17 of the next higher denomination, said gear 17 carrying the planet gear 18 and the C member 16. The gear 17 of the lowest denomination is locked against rotation by means of a pin 31 secured in one end plate 30 of the machine frame.

Calculating operations in a register according to the invention are performed in the usual manner; in the embodiment shown the driving gears (not shown) drive the transmission wheels 12; these driving wheels may have their rotary motion imparted in well-known manner, for instance from an actuator known per se. The driving wheels may also in well-known manner be driven differing amounts, depending on the value of the numeral set for each special case (for each denomination).

The motion of the driving or actuator driven wheels is transferred to the toothed ring 13 by means of the transmission gears 12 and from there via the planet gear 18 to the sun gear 20 and thus by means of any suitable gearing to the numeral wheels and also to the gear 17 of the next higher denominational order.

In the foregoing description the use of Geneva drive between the sun gear 20 of a lower order and the gear 17 of the next higher order has been disclosed and the reasons for the use of such a drive discussed. This use of a Geneva drive forms no part of the present invention but is disclosed in my copending application Serial No. 22,414 and is claimed therein. The invention which is here claimed resides in the structural arrangement of the gears 17 together with the planetary transmission comprising the ring 13, planet gear 18 and sun gear 21 in such a manner as to occupy a minimum of space axially of the register or accumulator.

The invention may, of course, within the scope of the following claim also be applied for instance, to registers with fully continuous tens transfer and the different details may also differ considerably in their construction.

I claim:

In a register for calculating machines having numeral wheels of different denominations individually operable by actuators capable of transmitting different numeral values to several denominations simultaneously, in combination, a gear intermittently driven synchronously with the numeral wheel of a lower denomination, a C-shaped bearing member concentrically secured to said gear, a planet gear rotatably journalled on said first mentioned gear in the space between the arms of said C-shaped bearing member, a toothed ring having both external and internal teeth, said internal teeth being in permanent mesh with the planet gear and bearing on said C-shaped bearing member and journalling the toothed ring thereon, and a sun gear in permanent mesh with said planet gear and enclosed by said bearing ring, said sun gear driving the numeral wheel of the next higher denominational order to effect tens transfer thereto, said toothed ring receiving direct actuating motion from the actuator for calculating operations, said C-shaped bearing member, toothed ring, planet gear and sun gear having substantially the same thickness in the axial direction to thereby render the accumulator compact axially and to permit of its use in conjunction with the printing mechanisms controlled thereby.

ERIK KONRAD GRIP.

REFERENCES CITED

The following references are of record in the file of this patent:

UNITED STATES PATENTS

| Number | Name | Date |
|---|---|---|
| 1,808,720 | Huber | June 2, 1931 |
| 1,853,054 | Horton | Apr. 12, 1932 |
| 2,356,914 | Blancha | Aug. 29, 1944 |